United States Patent Office 3,758,377
Patented Sept. 11, 1973

3,758,377
TREATED PAPER SHEET
Rodger L. Fife, San Jose, Calif., assignor to Georgia-Pacific Corporation, Portland, Oreg.
No Drawing. Filed May 6, 1971, Ser. No. 141,014
Int. Cl. D21h 3/02
U.S. Cl. 162—163        7 Claims

ABSTRACT OF THE DISCLOSURE

An aqueous mixture of lignosulfonate and isoprene resin ground to particulate form having a melting point of 80–130° C. in the ratio of lignosulfonate to isoprene resin in the range of 0.5:1 to 4:1 based on dry weights, said lignosulfonate and isoprene resin being mixed in the presence of from 0.1 to 5% based upon the dry weights of a urea formaldehyde resin having a viscosity range of 200 to 1500 centipoises prior to intermixing with cellulosic fibers.

---

This invention pertains to a method for the preparation of paper sheet and the composition thereof. More particularly, it pertains to the treatment of cellulosic fibers with a mixture of a lignosulfonate and an isoprene resin stabilized with urea-formaldehyde.

In many applications, it is often very desirable to have paper products possessing a certain stiffness and resistance to high humidity and water pickup. For example, in the manufacture of containers used for produces, such as vegetables and fruits, it is desirable to employ a paperboard or a corrugating medium having a certain degree of stiffness to protect the products in the containers. It is also desirable to have the product resistant to high humidity to which the containers are frequently exposed. The paper products or boards used in container manufacture usually contain from 7 to 10 percent by weight of moisture which may increase to above 30 percent upon exposure to high humidity or an environment of high moisture content. With the high increase in moisture content, the container generally loses the major portion of its rigidity and strength. Even though the container may retain sufficient strength to hold the products packed in the container, it generally does not have sufficient rigidity and strength for stacking of the containers or to withstand the normal handling involved in shipment.

In a copending patent application, Ser. No. 798,771, filed Feb. 12, 1969, now Pat. No. 3,630,833, an effective process is disclosed for strengthening paper and increasing its moisture resistance and improving other properties by the treatment of cellulosic fibers with a mixture of lignosulfonate and isoprene resin. Stabilization of the mixture with acetic acid and alkali metal acetate is also disclosed. It has now been found that the strength and moisture resistance of the treated paper can be further improved by use of an improved stabilizer for the lignosulfonate and isoprene resin mixture.

It is, therefore, an object of this invention to provide an improved stabilizer for the lignosulfonate-isoprene resin treating mixture. A further object is to provide a process for the preparation of a paper product which is relatively resistant to moisture and will retain a substantial portion of its strength and rigidity upon exposure to high moisture or humidity conditions. An additional object is to provide a method for the preparation of a stiffened paper with improved water resistant properties without adversely effecting the strength of other desirable properties.

The above and other objects are attained, according to this invention, by treating the cellulosic fibers in an aqueous slurry with a mixture of a lignosulfonate and an isoprene resin stabilized with a urea-formaldehyde resin prior to the formation of the paper sheet. The paper sheet obtained from fibers treated with the improved mixture of lignosulfonate-isoprene resin stabilized with the above urea-formaldehyde resin has the improved properties obtained by treating the paper sheet with lignosulfonate-isoprene resin mixture as noted in the copending application with further improvements in moisture resistance and strength.

The isoprene or terepene resins which are used in the treatment of the paper are resins obtained upon polymerization of isoprene to obtain polymers having a melting point in the range of from 80° to 130° C. They are generally hard, friable thermoplastic resins, soluble in most aliphatic, aromatic, and terepene solutions, and are often prepared by the polymerization of isoprene or by the polymerization of isoprene fractions obtained in the pyrolytic or steam cracking of hydrocarbon feed stocks in the manufacture of ethylene and propylene. Fractions obtained as by-products in this reaction contain predominantly isoprene and other closely related products which may be polymerized to form a resin operative in this invention. One such product, sold commercially under the trademark of Betaprene by the Reichold Chemical Company, is believed to be formed mainly of isoprene derivative repeating units having the formula:

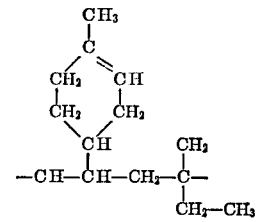

The lignosulfonates used in the invention may be obtained by sulfonation, by the various known methods, of lignin obtained from any source. Lignin is a polymeric substance of substituted aromatics found in plant and vegetable tissue associated with cellulose and other plant constituents. Thus, vegetable and plant tissues are lignin-containing materials which are the principal sources of lignin.

One of the main sources for lignosulfonate is the residual pulping liquors from the pulp and paper industry where lignocellulosic materials, such as wood, straw, corn stalks, bagasse and the like, are processed to separate the cellulose or pulp from the lignin. In the sulfite pulping process, the lignocellulosic material is digested with a sulfite or bisulfite to obtain a suufonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulosic materials from the other processes and also from the sulfite process may be treated by various known methods to sulfonate the product to the degree desired. For example, the residual liquor obtained in an alkaline pulping process such as kraft, soda or alkaline processes may be sulfonated and used.

The lignosulfonate product obtained from the sulfite pulping process or by the sulfonation of other residual pulping liquors or lignin-containing material may contain many other constituents besides the sulfonated lignin. For example, spent sulfite liquor may contain from 60 to 70 percent of sulfonated lignin with the remainder of the solids being carbohydrates, degradation products of carbohydrates, and resinous materials as well as other organic and inorganic compounds. While all or part of these other materials may be removed, it is not necessary to do so. The liquor may be fermented to remove the carbohydrates or fractionated by dialysis, solvent extraction or other means used to obtain not only a substantially purified lignosulfonate product but a product of a particular molecular weight range.

Thus, the terms "lignosulfonate" or "lignosulfonates" as used herein, as commonly used, include the purified sulfonated liqnins as well as the unpurified sulfonated lignin products such as spent sulfite liquors and sulfonated residual pulping liquors.

In the preparation of the lignosulfonate-resin mixture for the treatment of the cellulosic fibers, the resin in a fine particulate form of less than 250 microns in size is dispersed in a lignosulfonate solution, since the lignosulfonate is soluble in water. In intermixing the resin with the lignosulfonate solution, a temperature above room temperature, for example, 35° to 60° C., may be conveniently used. It is generally preferred to have the resin in a particle size as small as possible with a practical size being in the range of from 50 to 150 microns. The resin is friable and thus may be easily ground by the usual methods. Generally, when the resin is ground dry or in an aqueous medium, small amounts of grinding aid and a surfacant may be employed. Although the ratio of lignosulfonate to resin may be widely varied, generally the lignosulfonate is intermixed with the resin in a weight ratio of from 0.5 to 2.0 parts of lignosulfonate solids for each part of resin. Preferably, a ratio in the range of 0.75 to 1.3 parts of lignosulfonate per one part of resin is used.

The concentration of the resin and lignosulfonate in the aqueous mixture likewise may be widely varied. Generally, the content of the resin and lignosulfonate in the mixture is in the range of from 10 to 20 weight percent. However, more dilute mixtures, such as 5 percent or less as well as considerably more concentrated mixtures may also be used. The increased viscosity of the highly concentrated mixtures, for example, containing more than 50 percent solids, may not be as conveniently handled as the less viscous, less concentrated slurries or mixtures.

In addition to grinding the resin prior to intermixing with lignosulfonate, the resin may be ground and intermixed with lignosulfonate in one step by grinding the resin in a lignosulfonate solution or as a dry mixture. When this is done, the resin is usually added to the lignosulonate solution in an amount to obtain the desired ratio of resin to lignosulfonate in the final product. A solution of lignosulfonate containing from 20 to 50 percent solids may be conveniently used as the grinding medium. In addition to grinding the resin in the lignosulfonate, a dispersion of the resin in the lignosulfonate may also be obtained without grinding by forming an emulsion of the lignosulfonate with the resin at a temperature above the melting point of the resin and then cooling the mixture. Another method which may be used is to form an emulsion of the lignosulfonate solution with a solution of the resin in a solvent.

The urea-formaldehyde stabilizer used is a condensation product of urea with formaldehyde normally used in preparatiton of adhesives. The resins are usually prepared by reaction of from 0.8 to 3 moles, preferably from 1.5 to 2, of formaldehyde per mole of urea under acidic conditions in an aqueous medium. The condensation is advanced to an extent that the urea-formaldehyde resin, as a neutralized solution at a pH in the range of 7 to 10 containing about 65 weight percent resin, has a viscosity in the range of about 200 to 1500 centipoises, preferably 300 to 1000 centipoises. The stabilizer may be added to the lignosulfonate, or to the mixture of the lignosulfonate and the isoprene resin prior to the addition of the mixture to the pulp slurry. Thus, the order of addition of the stabilizer is not critical as long as it is intermixed with the mixture prior to addition to the pulp. The amount of stabilizer added can be varied from about 0.1 to 5 weight percent of the solids content of the mixture of lignosulfonate and isoprene resin. Generally the amount used is from about 0.5 to 2 percent of the solids content of the mixture.

In treating the cellulosic fibers with the lignosulfonate-resin mixture, the mixture is generally added in an amount of from about 0.25 weight percent to 5 weight percent of the mixture solids, based upon the dry cellulose in the slurry, but preferably in an amount of from 0.75 to 2 weight percent. The mixture is intermixed with the pulp or the cellulosic fiber slurry prior to the sheet formation. For example, when a cylinder machine is used, the mixture may be added to the cylinder vats. In a multiple cylinder machine, the mixture may all be added to one cylinder vat or distributed in equal or different proportions among the different vats. Generally, in a multicylinder machine, satisfactory results are obtained by adding the mixture only to some of the vats or cyilnders. For example, in a five cylinder machine the mixture may be equally divided and added to the number three and number four cylinders. In a Fourdrinier machine the mixture may be added to the pulp slurry in the stock chest, fan pumps or before the Jordan refiners.

To obtain the full advantages of the treatment, the paper sheet, during drying or otherwise, is heated to a temperature exceeding the melting point of the resin, preferably to a point at least 20° C. and often from 40° to 60° C. or up to 150° C. above the melting point. This results in the mixture being more uniformly and intimately distributed throughout the sheet enhancing the stiffness and moisture resistance. While the above treatment is especially effective for corrugating medium where moisture and humidity resistance and increased stiffness are desired, the same advantages can be obtained by the use of the mixture in the preparation of other paperboard which may be used for contaienr manufacture or as corrugated box linerboard.

The following example illustrates the invention.

EXAMPLE I

A corrugating medium was prepared from paper stock which had been treated with an isoprene-lignosulfonate mixture.

In the preparation of the lignosulfonate-resin mixture, an isoprene resin obtained by the polymerization of isoprene fractions obtained from hydrocarbon pyrolytic cracking in the manufacture of ethylene and propylene was used. The isoprene resin had a melting point of about 100° C. and was similar to the product sold by Reichold Chemical Company under the trademark of Betaprene H. This resin was ground in an impact-type grinder employing about 2.5 weight percent of an inert grinding aid.

About 750 pounds of ground resin and 750 pounds of dry spent sulfite liquor solid obtained from the calcium base sulfite pulping process were intermixed in about 1,500 gallons of water heated to 50° C. A dialkyldimethyl quaternary ammonium chloride cationic surfactant sold under the trademark of Arguad 2C–75 was added in an amount of 10 pounds to the mixture. The mixture was mixed for approximately ½ hour after which about 2½ gallons of a 65 percent urea-formaldehyde resin solution was added and intermixed for about 10 minutes. A polyethoxylated fatty acid nonionic surfactant was also added in an amount of about 5 weight percent.

The urea-formaldehyde resin was prepared by condensing 1.8 moles of formaldehyde per mole of urea and had a viscosity as a 65 percent aqueous solution neutralized to a pH of about 7.7 of about 600 centipoises.

The mixture thus prepared was added to a pulp slurry used in the preparation of corrugating medium on a cylinder machine. The mixture was added in an amount of about one percent of the lignosulfonate-resin solids, based upon the dry pulp content. The addition was made by adding half of the mixture to the number three cylinder vat and the remainder to the number four cylinder vat of a five cylinder machine.

The paper stock obtained from the so-treated cellulosic fibers, after drying, was passed through a corrugator in preparation of corrugating medium of "B" flutes. The single facer and the hot plate section of the corrugator were operated at about 175° C. resulting in heating the paper stock to a temperature above the melting point of the isoprene resin.

The corrugated medium prepared was tested for ConCora or edgewise compression test using the method described by R. C. McKee, J. W. Gander, and J. R. Wachuta of The Institute of Paper Chemistry, Appleton, Wis, in the November 1961 issue of Paperboard Packaging. Also, flat crush tests were made of corrugated board prepared from the corrugated medium. The flat crush tests were made under TAPPI Standards Method T–808 using standard humidity conditions where the board was exposed for 24 hours at 73° F. to an atmosphere having 50 percent relative humidity and humid conditions where the board was exposed for 24 hours at 40° F. to an atmosphere having 80 percent relative humidity.

In addition to the above, a corrugated medium was prepared from paper sheet which had not been subjected to the treatment with lignosulfonate and also from paper sheet which had been treated with the lignosulfonate-isoprene mixture stabilized with the acetic acid-alkali metal acetate stabilizer similar to that disclosed in Example I of copending patent application, Ser. No. 798,771 now Pat. No. 3,630,833 referred to above. The details and the results of the tests obtained are shown in the table below.

prene resin being mixed in the presence of from 0.1 to 5 weight percent, based upon the dry weights, of a urea-formaldehyde resin prior to intermixing with the cellulosic fibers, said urea-formaldehyde resin being formed by reacting formaldehyde with urea in a mole ratio of 0.8 to 3 moles of formaldehyde per mole of urea to the extent that a 65 weight percent aqueous solution of the urea-formaldehyde resin at a pH in the range of 7 to 10 has a viscosity in the range of from 200 to 1500 centipoises.

2. A process according to claim 1 wherein the isoprene resin and the lignosulfonate are mixed in the presence of from 0.5 to 2 weight percent of the urea-formaldehyde stabilizer.

3. A process according to claim 2 wherein the lignosulfonate is a spent sulfite liquor.

4. A process according to claim 3 wherein the ratio of spent sulfite liquor solids to the isoprene resin is in the range of from 0.75:1 to 2.0:1, with the urea-formaldehyde resin being formed by reacting from 1.5 to 2 moles of formaldehyde per mole of urea to a viscosity of from 300 to 1,000 centipoises, and the cellulosic fibers are treated with from 0.5 to 2 weight percent of the stabilized mixture of spent sulfite liquor and the isoprene resin.

5. A process according to claim 4 wherein the cellulosic fibers treated with the mixture of spent sulfite liquor and isoprene resin are subsequently dewatered and heated at a temperature exceeding the melting point of the resin by from 20° to 100° C.

| Treatment of paper sheet | Thickness of paper sheet, inches | Basic weight, lbs./1,000 ft.$^2$ | ConCora, lbs./in.$^3$ | Flat crush of corrugated board, lbs./in.$^2$ | |
|---|---|---|---|---|---|
| | | | | Standard | Humid |
| No treatment | .0135 | 34.1 | 65.1 | 54 | 27.1 |
| Treated with acetic acid-stabilized mixture | .0130 | 33.5 | 70.2 | 63.4 | 44.1 |
| Treated with urea-formaldehyde stabilized mixture | .0125 | 33.4 | 90.4 | 66.1 | 48.1 |

What is claimed is:

1. In a process for the preparation of paper sheet wherein a paper sheet is formed from an aqueous slurry of cellulosic fibers, the improvement to increase strength and water resistance of the paper sheet which comprises treating the cellulosic fibers in an aqueous slurry with 0.25 to 5 weight percent of a stabilized mixture consisting essentially of a lignosulfonate and isoprene resin, said resin having a melting point in the range of 80° to 130° C., dewatering the cellulosic fibers, and heating the dewatered fibers to a temperature exceeding the melting point of the isoprene resin, said mixture of lignosulfonate and isoprene resin being formed by mixing in an aqueous medium the lignosulfonate with the isoprene resin ground to a particulate form in a ratio of lignosulfonate to the resin in the range of 0.5:1 to 4:1, based upon the dry weights, said lignosulfonate and iso- 6. A process according to claim 5 wherein the paper sheet is heated at a temperature in the range of from 40° to 60° C. in excess of the melting point of the isoprene resin.

7. A paper sheet obtained by the process of claim 1.

References Cited
UNITED STATES PATENTS 3,630,833   12/1971   Fife _____ 162—163
2,898,239   11/1956   Sulzer et al. _____ 260—29.4 UA S. LEON BASHORE, Primary Examiner
P. CHIN, Assistant Examiner U.S. Cl. X.R.
162—164, 169